(12) United States Patent
Wöhner

(10) Patent No.: US 7,170,278 B2
(45) Date of Patent: Jan. 30, 2007

(54) DEVICE FOR SENSING THE AXIAL POSITION, IN RELATION TO THE OTHER COMPONENT, OF ONE OF TWO COMPONENTS MOBILE RELATIVE TO EACH OTHER

(75) Inventor: Steffen Wöhner, Heubischer Strasse (DE)

(73) Assignee: FTE automotive GmbH, Ebern (DE)

( * ) Notice: Subject to any disclaimer, the term of this patent is extended or adjusted under 35 U.S.C. 154(b) by 149 days.

(21) Appl. No.: 10/865,375

(22) Filed: Jun. 10, 2004

(65) Prior Publication Data

US 2005/0000772 A1  Jan. 6, 2005

(30) Foreign Application Priority Data

Jun. 11, 2003 (DE) ................. 103 26 638

(51) Int. Cl.
*G01B 7/14* (2006.01)
*G01R 33/07* (2006.01)
*F01B 25/26* (2006.01)

(52) U.S. Cl. ............... 324/207.24; 324/207.2; 92/5 R

(58) Field of Classification Search ........ 324/207.11–207.26; 92/5 R; 91/1
See application file for complete search history.

(56) References Cited

U.S. PATENT DOCUMENTS 3,226,631 A * 12/1965 Friedrich et al. ........... 323/368
4,705,151 A   11/1987 Leigh-Monstevens et al.
4,793,241 A * 12/1988 Mano et al. .................. 92/5 R
4,841,246 A *  6/1989 Juds et al. ............. 324/207.11
5,201,838 A *  4/1993 Roudaut ...................... 294/88
5,574,365 A   11/1996 Oyama et al.
6,160,395 A * 12/2000 Goetz et al. ........... 324/207.21
2004/0007125 A1  1/2004 Stobrawe et al.

FOREIGN PATENT DOCUMENTS

DE       41 20 643 A1   12/1992
DE      199 15 832 A1    7/2000
JP        402075901 A  *  3/1990 ............ 324/207.11
JP        404032786 A  *  2/1992 ............ 324/207.11

OTHER PUBLICATIONS

Houben, Hans; Marto, Arno; Wagner, Klaus; Gebert, Stefan and Wohner, Steffen Contactless Wear-Free Distance Sensors in Clutch and Brake Systems; ATZ 112/2002, vol. 104 pp. 1075-1081.

* cited by examiner

*Primary Examiner*—Edward Lefkowitz
*Assistant Examiner*—Kenneth J. Whittington
(74) *Attorney, Agent, or Firm*—Reising, Ethington, Barnes, Kisselle, P.C.

(57) ABSTRACT

A device (16) for sensing the axial position, in relation to the other component, of one of two components mobile relative to each other, in particular a piston (12) in relation to a cylinder housing (14), which device has a magnetic signal element (18) arranged on the one component and a magnetic-flux-sensitive sensor (20, 20∝) arranged on the other component, of which the axial relative position of the signal element to the sensor can be detected. One flux guide element (22, 22') is allocated to the sensor stationary in relation to the sensor, which extends on the other component at least over the area to be detected of the axial relative positions of the signal element to the sensor and comprises a plate section of a magnetizable material, wherein the sensor is arranged at one longitudinal end of the flux guide element outside the area to be detected of axial relative positions.

11 Claims, 5 Drawing Sheets

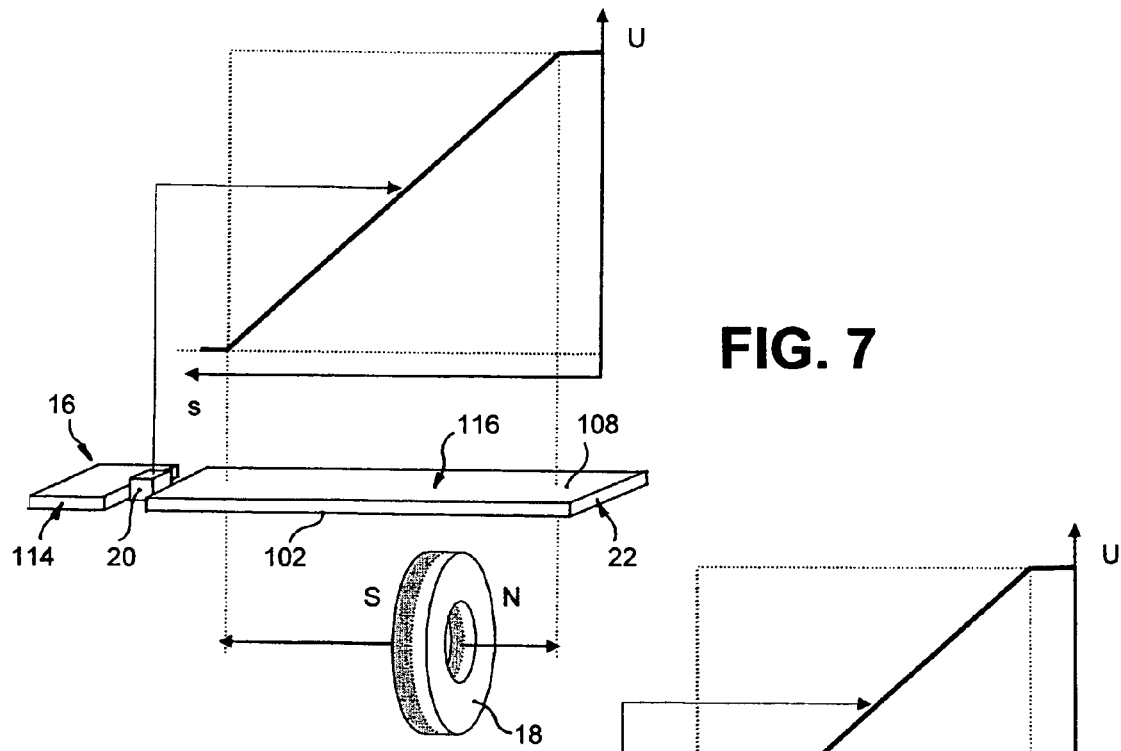
FIG. 7
FIG. 8
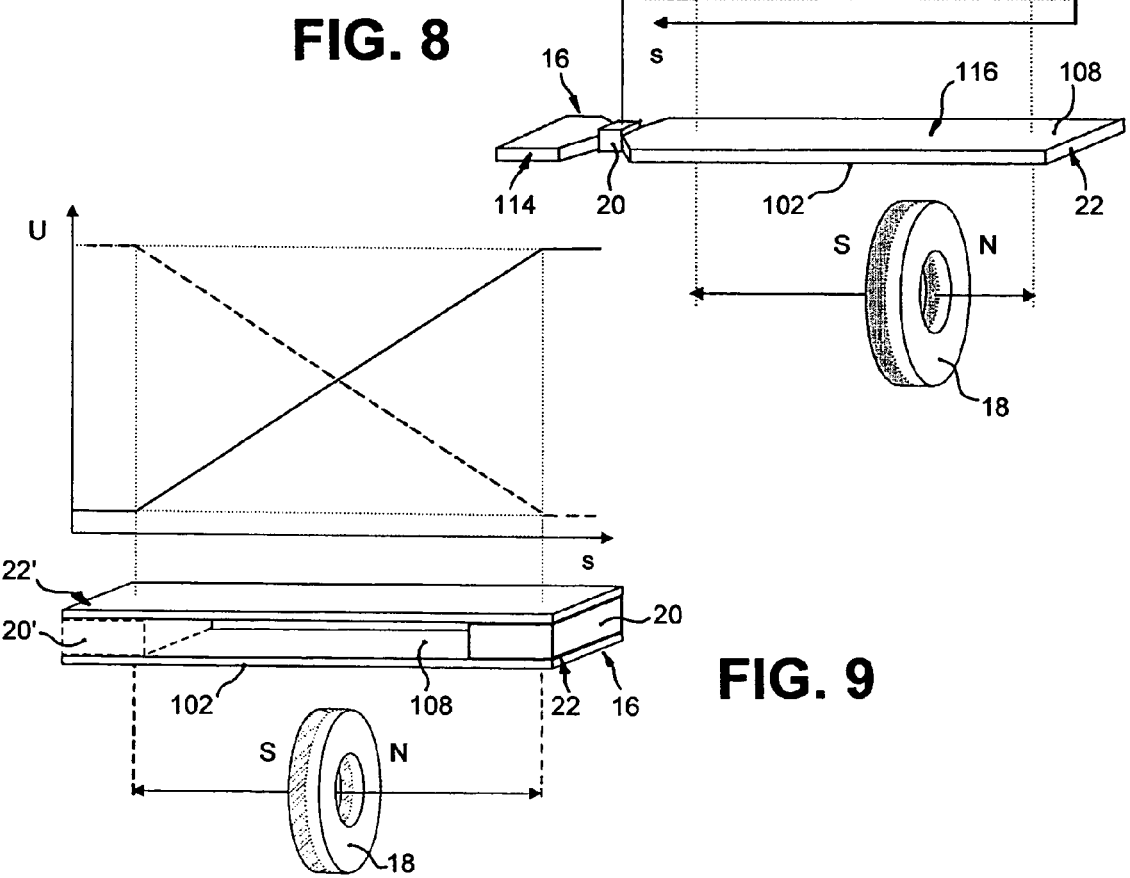
FIG. 9

DEVICE FOR SENSING THE AXIAL POSITION, IN RELATION TO THE OTHER COMPONENT, OF ONE OF TWO COMPONENTS MOBILE RELATIVE TO EACH OTHER

TECHNICAL FIELD

The invention relates to a device for sensing the axial position, in relation to the other component, of one of two components mobile relative to each other according to the preamble portion of claim 1. In particular the invention relates to a device for sensing the axial position of a piston in relation to a cylinder housing of a master or slave cylinder for a hydraulic clutch control for motor vehicles, as is used in large quantities in the automotive industry.

STATE OF THE ART

A conventional hydraulic clutch control for motor vehicles has a master cylinder which is connected to a reservoir filled with hydraulic fluid and which for example can be activated via a clutch pedal or an electro-motor drive. The master cylinder is hydraulically connected via a pressure line with a slave cylinder so that the pressure generated by pressing the clutch pedal or by electro-motor movement of the master cylinder piston in the master cylinder can be transferred via the fluid column in the pressure line to the slave cylinder. As a result the release bearing of the clutch is exposed to a control force via the slave cylinder piston in order, via a release mechanism, to separate the clutch pressure plate from the clutch carrier plate and hence the engine from the gearbox of the motor vehicle. Hydraulic clutch controls are also known in which the clutch release mechanism can be activated by a master or slave cylinder actively connected therewith, which in turn is controlled by a hydraulic servo circuit.

In such hydraulic clutch controls for motor vehicle, in the prior art it has already been proposed, by means of suitable mechanical, electrical or magnetic devices, to sense the position of the piston of the master or slave cylinder (e.g. U.S. Pat. No. 4,705,151, DE 41 20 643 A1), in order to conclude indirectly from this the position of the clutch pressure plate. Such sensing gives firstly information on the state of wear of the clutch. Secondly the engagement or release state of the clutch can be determined, so that e.g. for automated friction clutches the clutch operation can be controlled automatically to the desired extent. The results of sensing can finally also be used for safety precautions in operation of the vehicle, for example in that the vehicle can only be started when the clutch pedal is pressed.

In this context DE 199 15 832 A1 discloses a master cylinder which has a piston arranged longitudinally displaceable in a housing. On the piston is a ring groove which serves to hold a ring magnet. On the housing of this master cylinder is a holder part in which are arranged two Hall switches, associated analysis electronics and a connection contact. By means of the Hall switches, through the wall of the cylinder housing the position of the ring magnet and hence the position of the piston can be detected, whereupon the corresponding switch signal is then prepared by the analysis electronics and output via the connection contact for further processing.

The position sensor described there, comprising a ring magnet and two Hall switches, is however only able to detect the end positions of the piston. Intermediate positions or the piston travel cannot be detected precisely, but this is necessary if precise information is required on the state of wear of the clutch or automatic control of the release or engagement movement is required.

The same applies to the position sensor known from DE 100 53 995 A1 on a tandem master cylinder of a motor vehicle braking system, with a housing-side Hall element which co-operates with a magnetic metal pin on the piston side in order to emit a signal at a particular piston position e.g. to trigger a brake light; also to the working cylinder described in DE 41 16 651 C2 which has a cylinder tube in which is displaceably arranged a piston fitted with a permanent magnet and a sensor which is arranged by means of a fixing device in the area of the outer periphery of the cylinder tube and which can be activated contactless by the magnetic field of the permanent magnet, in which working cylinder the sensor is arranged at a distance from the outer periphery of the cylinder tube, where between the sensor and the cylinder tube is provided a magnetic field guide device guiding at least part of the magnetic field of the permanent magnet to the sensor.

Furthermore DE 197 38 316 A1 discloses a device for non-contact measurement of the wear of a brake pad in disc brakes. Here the release plate of the brake pad is coupled by a connecting element to a measurement rod of a distance sensor which is firmly connected to a rod magnet. The position of the rod magnet is detected contactless by a Hall element. To improve the sensitivity of the rod magnet at least one pole shoe is provided in which the Hall element is inserted. This device is however only suitable within narrow limits for use on a conventional piston-cylinder arrangement, in particular as twisting of the radially magnetized rod magnet in relation to the Hall element must be prevented, usually causing a relatively high friction.

Furthermore the generic trade article "Contactless wear-free distance sensors in clutch and brake systems" by Houben, Hans; Marto, Arno; Wagner, Klaus; Gebert, Stefan and Wöhner, Steffen in ATZ 112/2002, vol. 104, pages 1076 to 1081, discloses a sensor device for in particular clutch cylinders which has, arranged on the cylinder housing, a sensor sensitive to magnetic flux in the form of a Hall sensor which co-operates with a magnetic signal element in the form of a rod-like permanent magnet arranged on the piston in order to detect the axial relative position of the permanent magnet to the Hall sensor and hence that of the piston to the cylinder housing.

The sensor device disclosed there is indeed able to detect any positions of the piston in relation to the cylinder housing or the piston travel. For this according to this prior art however a long rod magnet must be provided which extends over the entire range to be detected of axial relative positions of the piston to the cylinder housing, through the piston. This requires a relatively large axial installation space in the piston for accommodation of the rod magnet which can also lead to undesirable enlargement of the total cylinder length. In addition here the mechanical stability of the rod magnet requires particular attention so that this does not break e.g. on assembly of the rod magnet in the piston. Therefore the rod magnet must not be formed too thin. A thicker design of the rod magnet however undesirably enlarges the radial installation space for accommodation of the rod magnet in the piston, not to mention the associated higher costs for the rod magnets, which is also undesirable in view of the large-scale use of such sensor devices. Finally DE 694 09 807 T2 discloses a magnetic detector of a distance attributable to a movement, with a magnet mobile along a path, a magnetic body and a magnetically-sensitive element arranged on the magnetic body, the magnetic body having an area which extends along the path opposite the magnet. In an embodiment described in DE 694 09 807 T2 of the magnetic detector (FIGS. 13 and 14) in which a magneto-resistor is attached centrally to a magnetic body of circular cross-section which extends over a part area of the movement range of the mobile magnet, an essentially linear graph is obtained of the output voltage of the magneto-resistor over the travel of the magnet, which is fundamentally desirable for clear distance detection. This magnetic detector however only has a low signal yield i.e. the output voltage of the magneto-resistor here runs only with a very slight gradient over the travel of the magnet, for which reason in this state of the art it is at least difficult to design the signal analysis for precise determination of the distance traveled. In addition, with this state of the art the magnetic body—which can also have the form of a frustoconical pyramid in other preferred embodiments—has a relatively high mass which is undesirable for particular applications.

SUMMARY OF THE INVENTION

Starting from the generic prior art, the invention is based on the object of creating a device structured as simply as possible to sense the axial position, in relation to the other component, of one of two components mobile relative to each other, in particular a piston in relation to a cylinder housing of a master or slave cylinder for a hydraulic clutch control for motor vehicles, by means of which device with minimum installation space requirements for the device any axial relative positions between the components involved or their relative travel can be reliably detected.

According to the invention in a device for sensing the axial position, in relation to the other component, of one of two components mobile relative to each other, in particular a piston in relation to a cylinder housing of a master or slave cylinder for a hydraulic clutch control for motor vehicles, which device has a magnetic signal element arranged on the one component and at least one magnetic-flux-sensitive sensor arranged on the other component, by means of which the axial relative position of the magnetic signal element to the magnetic-flux-sensitive sensor can be detected, allocated to the magnetic-flux-sensitive sensor is at least one flux guide element which is stationary in relation to the magnetic-flux-sensitive sensor and which extends on the other component at least over the area to be detected of axial relative positions of the magnetic signal element to the magnetic-flux-sensitive sensor and comprises a plate section of a suitable magnetizable material such as a dynamo core sheet section, the sensor being arranged at one of the longitudinal ends of the flux guide element outside the area to be detected of axial relative positions of the signal element to the sensor.

The flux guide element allocated to the magnetic-flux-sensitive sensor and stationary in relation thereto, of the sensor device according to the invention serves virtually for bundling the field lines of the magnetic field of the magnetic signal element so that relatively high field strengths H arise in the flux guide element. In other words in the flux guide element there is a concentration of the magnetic flux Φ, the density of which i.e. the magnetic flux density B can be sensed by means of the magnetic-flux-sensitive sensor. The closer the magnetic signal element comes, during a movement along the flux guide element, to a measurement point on the flux guide element at which the magnetic flux density B in the flux guide element is sensed by means of the magnetic-flux-sensitive sensor, the higher the magnetic flux density B sensed.

If a Hall sensor with a Hall element of e.g. silicon is used as a magnetic-flux-sensitive sensor, which is preferred because the associated analysis electronics can be integrated therewith in a simple and hence economic manner in semiconductor production, then due to the magnetic field of the magnetic signal element bundled by the flux guide element, the charge carriers are deflected at the Hall element through which an electrical current flows. This movement of the charge carriers in the Hall element creates potential differences at the current path through the parallel electrodes in the Hall element, at which these potential differences can be detected as a transverse or Hall voltage $U_H$. This Hall voltage $U_H$, for constant current density I of the current flowing through the Hall element, is directly proportional to the magnetic flux density B in the flux guide element.

From the description above it is evident that with the sensor device according to the invention, by means of the magnetic-flux-sensitive sensor the magnetic flux density B in the flux guide element can be sensed, which again constitutes a measurement of the axial distance between the magnetic signal element and the magnetic-flux-sensitive sensor so that the axial relative positions of the magnetic signal element to the magnetic-flux-sensitive sensor can be detected continuously, or in other words a detection of the relative travel is possible here, using only a few components. Thus the embodiment of the sensor device according to the invention allows the use of a magnet which is small in comparison with the generic prior art, which only requires a very short axial installation length and need not extend over the entire area to be detected of axial relative positions between the components concerned. The long rod magnets provided in the generic prior art can be omitted, so that the associated disadvantages can also be avoided.

The fact that in the sensor device according to the invention, the flux guide element on the second component extends at least over the area to be detected of axial relative positions of the magnetic signal element to the magnetic-flux-sensitive sensor, is beneficial to the reception of clear sensor signals. This is because in the measurement area of the sensor device there is always an axial overlap of the signal element and flux guide element, which in a simple manner prevents a change of prefix of the magnetic field detected which would occur if the magnetic signal element could move in the axial direction beyond the flux guide element, in the measurement area of the sensor device relative to the magnetic-flux-sensitive element. In other words in the sensor device according to the invention the desired measurement range no longer determines the length of the magnet as in the generic prior art, but the length of the disproportionally cheaper flux guide element. As a result the sensor device according to the invention opens up areas of application which were previously reserved for usually expensive coil-bonded i.e. inductive sensor devices, where the design of the sensor device according to the invention in relation to inductive sensor devices has the additional advantage that axial relative movements of the signal element to the sensor can be detected reliably even at high movement speeds.

A further advantage of the sensor device according to the invention is that, in contrast to the generic sensor device with its long rod magnets, it can also be used reliably on piston-cylinder arrangements in which the pistons tilt through a particular angle amount in relation to the cylinder housing as a function of the axial piston position, as is described e.g. in DE 43 31 241 A1 by the applicant.

Because the flux guide element comprises a plate section of a suitable magnetizable material such as a ferromagnetic dynamo core sheet section, further benefits arise: besides advantages in construction space and weight associated with a plate section i.e. a material section very much smaller in the thickness direction than in its width and length direction, a plate section has the further advantage that according to the requirements it can easily be adapted to the geometry of the components whose relative movement is to be detected. Thus for example in an area of the invention preferred here, although not restricting the invention, namely the sensing of the axial position of a piston in relation to the cylinder housing of a master or slave cylinder for a hydraulic clutch control for motor vehicles, the flux guide element can easily be adapted to the curvature of the cylinder housing or piston by bending the plate section, which again in particular benefits a very small installation space requirement for the sensor device.

The end-mounted arrangement of the magnetic-flux-sensitive sensor on the flux guide element finally has the advantage that the graph of the signal, representative of the magnetic flux density B in the flux guide element and hence the relative movement of the magnetic signal element to the flux guide element, over the travel rises steadily as the magnetic signal element axially approaches the magnetic-flux-sensitive sensor, or falls steadily as the magnetic signal element moves axially away from the magnetic-flux-sensitive sensor, so that the signal is easy to analyze. If the magnetic-flux-sensitive sensor is arranged approximately centrally in relation to the flux guide element, in analysis of the signal suitable account must be taken of the side from which the magnetic signal element approaches the magnetic-flux-sensitive sensor or to which the magnetic signal element moves away from the magnetic-flux-sensitive sensor, which would make the signal analysis more complicated.

In principle any magnets can be used for the magnetic signal element, such as e.g. an electromagnet. However an embodiment is preferred in which the magnetic signal element is a permanent magnet which advantageously requires no energy supply to create a magnetic field. Preferably the permanent magnet is a very compact ring magnet. Other magnet geometries e.g. small square or cuboid magnets are also possible depending on installation requirements.

In principle for the magnetic-flux-sensitive sensor, any sensor can be used which—as its name says—is able to detect the magnetic flux in the flux guide element or a change in this. Thus magneto-resistive sensors could also be used. Preferably however Hall sensors are used which have the advantages discussed above. Such Hall sensors are today commercially available relatively cheaply, also in programmable form. Programmable Hall sensors can advantageously, depending on requirements, perform linearization and/or temperature compensation on a distance curve, adapt easily to very different interfaces, or even have a teaching function so that the distance curve e.g. in regard to establishing the start and end points, gradient and amplification of the signal, can be adapted optimally to the application concerned.

In principle it is possible that the flux guide element for example extends in a direction which encloses a predetermined angle with the direction of the relative axial movement of the one component in relation to the other component. However a design of the sensor device according to the invention is preferred in which the flux guide element extends essentially in the direction of the axial relative movement of the one component in relation to the other component, i.e. lies in the movement direction as this firstly minimizes the radial installation space required for the sensor device. Secondly with such a design of sensor device, the analysis of the signal received by the magnetic-flux-sensitive sensor and representative of the magnetic flux density B in the flux guide element is simpler.

If the magnetic-flux-sensitive sensor lies against the allocated flux guide element, preferably over a large surface, a very good level of signal representative of the flux density B in the flux guide element is expected. However the magnetic-flux-sensitive sensor could also be arranged at a distance from the flux guide element depending on the installation requirements, where the distance should however be as small as possible with a view to perfect signal analysis.

The magnetic-flux-sensitive sensor can lie at one of the longitudinal ends of the flux guide element on a longitudinal surface of the flux guide element. As an alternative to end-mounting of the magnetic-flux-sensitive sensor on the flux guide element, the magnetic-flux-sensitive sensor can also lie on a long-end face of the flux guide element where desirable or necessary in view of the installation space available.

In another alternative of the sensor device according to the invention it can be provided that the flux guide element is divided longitudinally into two sections, between which is inserted the magnetic-flux-sensitive sensor, whereby the magnetic-flux-sensitive sensor advantageously lies directly in the magnetic flux concentrated in the flux guide element. If the magnetic-flux-sensitive sensor consequently lies in the main flux or area of maximum field intensity in the flux guide element, this is beneficial for reception of a signal representative of the magnetic flux density B in the flux guide element with a high signal strength. Suitably two sections of the flux guide element can taper towards the magnetic-flux-sensitive sensor.

If redundancy of sensor signals is desirable or required for particular technical applications, two magnetic-flux-sensitive sensors can be provided. In view of the advantages outlined above associated with an end-mounted arrangement of the magnetic-flux-sensitive sensor on the flux guide element, the arrangement here can be made in a compact manner which does not enlarge or scarcely enlarges the installation space required, so that the one magnetic-flux-sensitive sensor is arranged at one longitudinal end of the flux guide element while the other magnetic-flux-sensitive sensor is arranged at the other longitudinal end of the flux guide element. In principle however a parallel arrangement of the two magnetic-flux-sensitive sensors at one end of the flux guide element is conceivable.

Also two flux guide elements can be provided which run essentially parallel to each other and between which is inserted the magnetic-flux-sensitive sensor. Admittedly in this design of sensor device the signal detected, which is representative of the magnetic flux density B in the flux guide element, is weaker in comparison with a design with just one flux guide element. However, the two flux guide elements advantageously provide linearization of the signal shown over the relative travel of the magnetic signal element to the magnetic-flux-sensitive sensor, which simplifies analysis of the signal.

In a preferred application of the sensor device according to the invention, the magnetic signal element, preferably a ring magnet, can be arranged on a piston of a master or slave cylinder for a hydraulic clutch control for motor vehicles as known e.g. from DE 202 08 568 U1 by the applicant and which has already proved successful in series production, while the magnetic-flux-sensitive sensor with the allocated flux guide element is attached to a cylinder housing of the master or slave cylinder. In principle the arrangement could even be reversed, with the magnetic signal element on the cylinder housing and the magnetic-flux-sensitive sensor and allocated flux guide element on the piston. The latter arrangement could however in some cases lead to installation space problems on the piston. Here too the signal from the magnetic-flux-sensitive sensor would have to be taken from the piston and a power supply to the magnetic-flux-sensitive sensor on the piston guaranteed, which would require the fundamentally undesirable connection of a line to the piston as the moving component.

Finally in this preferred application of the sensor device according to the invention, the magnetic-flux-sensitive sensor and the allocated flux guide element can advantageously be accommodated in a common sensor housing, which—as described for example by DE 201 16 818 U1 by the applicant—can be attached at a predetermined point to the cylinder housing of the master or slave cylinder.

BRIEF DESCRIPTION OF THE DRAWINGS

The invention is now described below with reference to preferred embodiments using the enclosed partly diagrammatic drawings. Here:

FIG. 7 is a principle view of a sensor device in a further embodiment of the invention with associated voltage-distance curve (U=f(s)), wherein the view corresponds to that in FIG. 5, FIG. 8 is a principle view of a variant of the sensor device according to FIG. 7 with associated voltage-distance curve (U=f(s)), wherein the view again corresponds to that in FIG. 5, and FIG. 9 is a principle view of a sensor device according to a further embodiment of the invention with associated voltage-distance curve (U=f(s)), wherein the view again corresponds to that in FIG. 5.

DETAILED DESCRIPTION OF THE PREFERRED EMBODIMENTS

Figure 1:
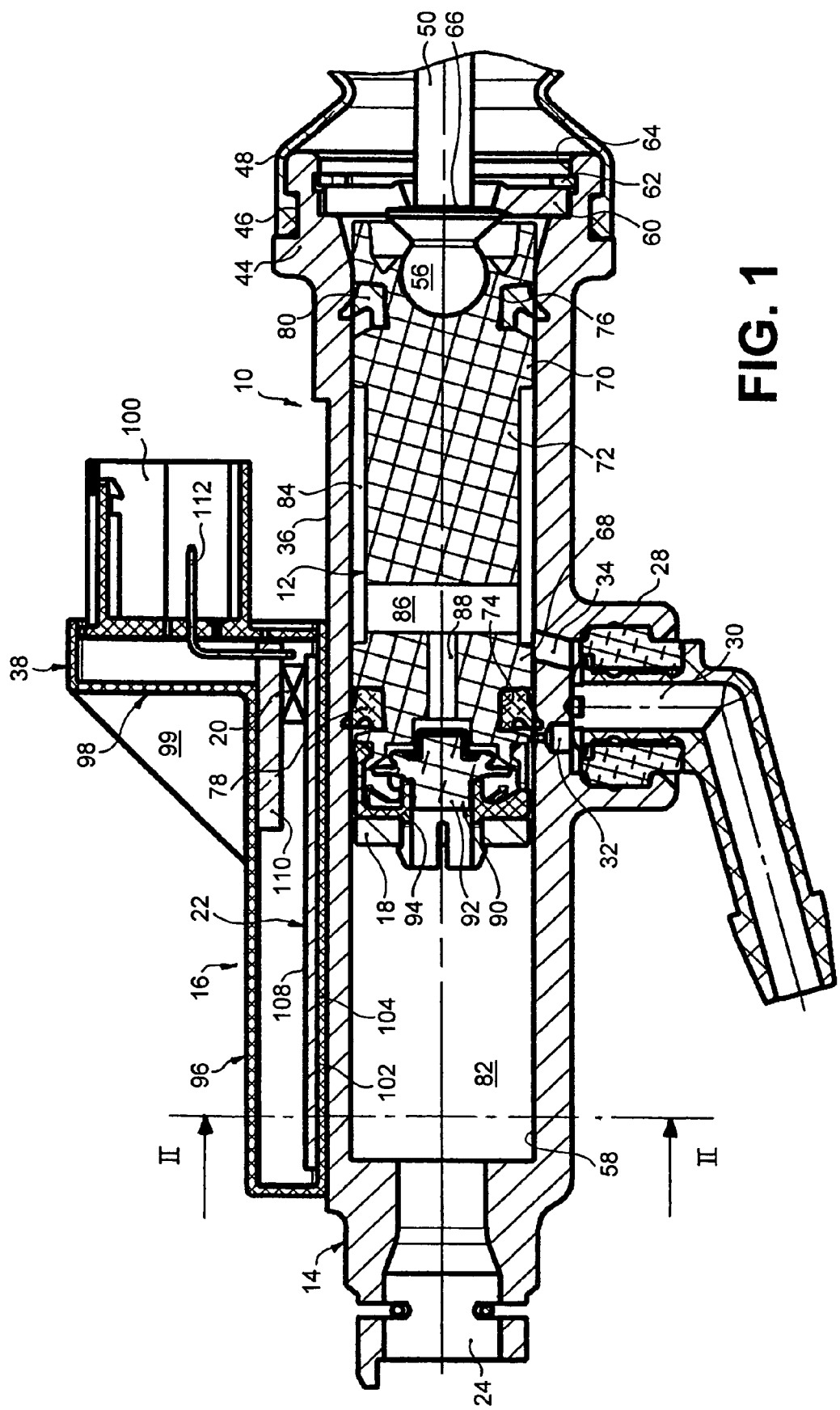
FIG. 1 shows a broken-away longitudinal section view of a master cylinder with a piston and a cylinder housing for a hydraulic clutch control for motor vehicles, on which is mounted a device according to the invention to sense the axial position of the piston in relation to the cylinder housing, which comprises a magnetic signal element on the piston side and a magnetic-flux-sensitive sensor with allocated flux guide element on the cylinder housing side.
Figure 2:
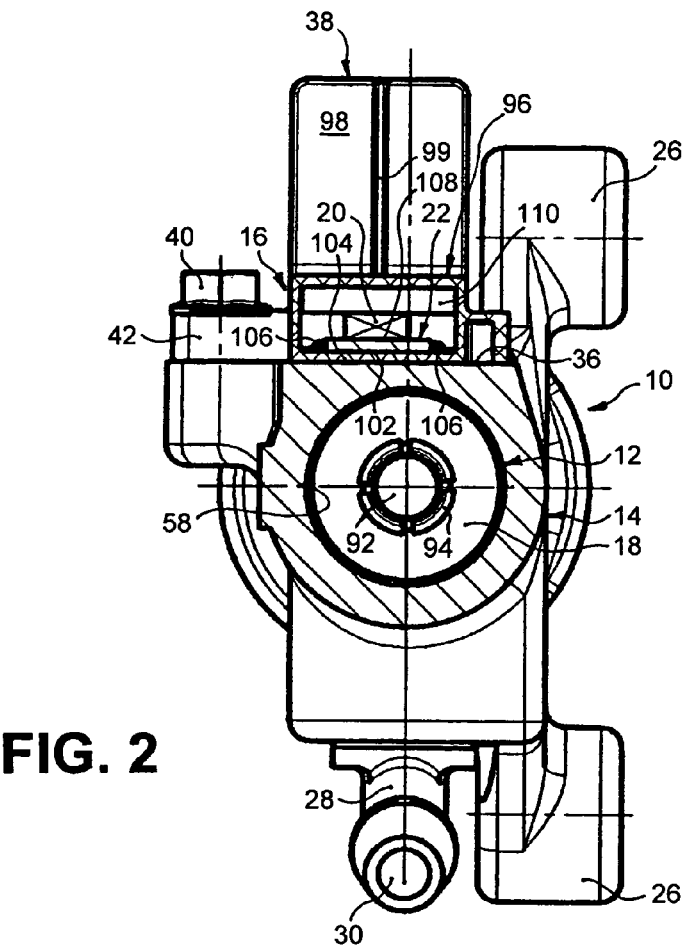
FIG. 2 shows a cross-section of the master cylinder according to FIG. 1 along line II—II in FIG. 1.
Figure 3:
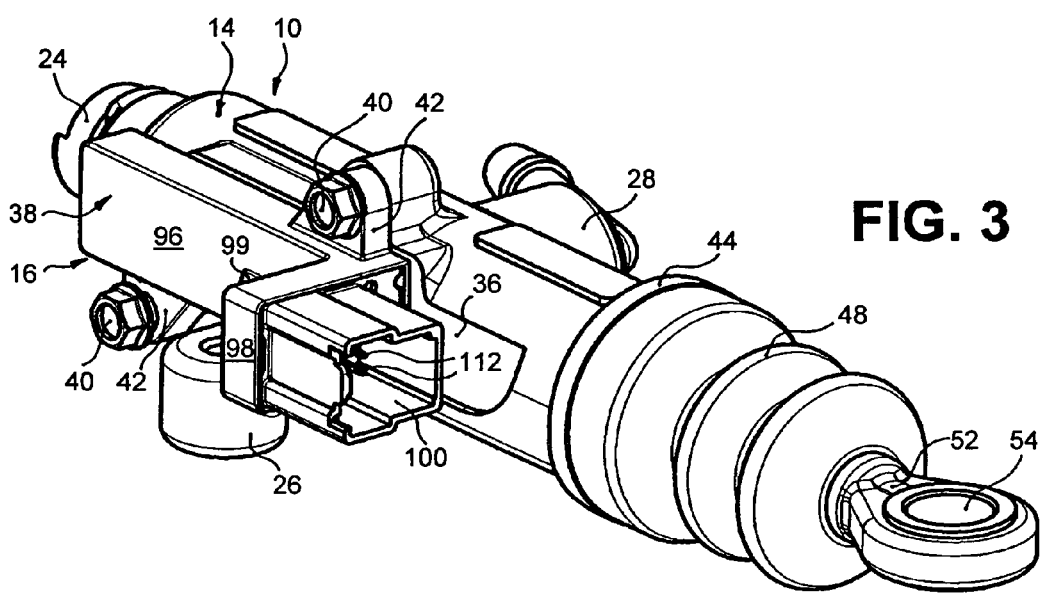
FIG. 3 is a perspective view of the master cylinder in FIG. 1.

FIGS. 1 to 3 show as examples of a possible application of the present invention a master cylinder 10 for a hydraulic clutch control for motor vehicles which here has a piston 12, shown in its base position, which is held longitudinally mobile in a cylinder housing 14. 16 indicates generally a sensor device to sense the axial position of the piston 12 in relation to the cylinder housing 14, which has here arranged on the piston 12 a magnetic signal element in the form of an annular permanent magnet known as a ring magnet 18, and arranged on the cylinder housing 14 a magnetic-flux-sensitive sensor in the form of a Hall sensor 20, by means of which the axial relative position of the ring magnet 18 to the Hall sensor 20 can be detected in a manner to be described. As will also be described below, it is essential inter alia that at least one flux guide element 22, stationary in relation to the Hall sensor 20, is allocated to the Hall sensor 20 and extends on the cylinder housing 14 at least over the area to be detected of axial relative positions of the ring magnet 18 to the Hall sensor 20.

As FIGS. 1 and 3 show in particular, in the embodiment shown the cylinder housing 14 made of NF metal such as aluminum alloy has at its left-hand end in FIG. 1 a pressure connection 24 via which the master cylinder 10 can be connected with a slave cylinder (not shown). The cylinder housing 14, as shown in FIGS. 2 and 3, is furthermore fitted essentially centrally in the longitudinal direction with two fixing flanges 26 on opposite sides for attachment to a pedal block (not shown) for example and an overrun connection 28 shown in the bottom in FIGS. 1 and 2. Via the overrun connection 28, the master cylinder 10 can be connected to an overrun reservoir (not shown). The overrun connection 28 has an overrun channel 30 which opens into a pressure compensation bore 32 and an overrun bore 34.

On the top side in FIGS. 1 and 2, the cylinder housing 14 has a flat support surface 36 for a sensor housing 38 here made of plastic, in which are accommodated inter alia the Hall sensor 20 and the allocated flux guide element 22. On the support surface 36 of the cylinder housing 14, the sensor housing 38 lies flat in the fitted state of the sensor device 16 shown in FIGS. 1 to 3. In the embodiment shown in FIGS. 1 to 3, the sensor housing 38 is fixed to the cylinder housing 14 at a predetermined point on the cylinder housing 14 by means of bolts 40 which are screwed into allocated threaded bores (not shown) on the cylinder housing 14 and thus extend through and behind the fixing flange 42 of the sensor housing 38. As an alternative to this fixing, the sensor housing 38 could also be locked by means of a snap connection to the cylinder housing 14 as described in more detail in DE 201 16 818 U1 by the applicant, to which in this connection express reference is made here.

At the right-hand end in FIG. 1, the cylinder housing 14 has a flange section 44 with a radial groove 46 on the outer periphery which serves to fix an elastomer protective cover 48. The right-hand end of the bellows-like protective cap 48 shown in FIG. 3 is established at a stud 50 which on the right-hand side in FIG. 3 is firmly connected with a stud head 52 which has a connecting eye 54 for connection to a clutch pedal (not shown). The left-hand end of the stud 50 in FIG. 1 has a spherical head 56 via which the stud 50 is connected swivellably but tension- and compression-resistant with the piston 12, here comprising plastic.

The piston 12 held longitudinally displaceable in a cylindrical blind bore 58 of the cylinder housing 14 is secured by means of a slotted stop plate 60 in the cylinder housing 14 which in turn is attached by means of a locking ring 62 to a shoulder 64 of the cylinder housing 14. The stop plate 60 co-operates with a tension stop 66 provided on the stud 50 and a pressure stop (not shown) also on the stud 50 in order to limit the stroke of the piston 12 in the cylinder housing 14.

In the embodiment shown the piston 12 has two essentially cylindrical sections 68, 70 which are connected together via a connecting section 72. Each of the cylindrical sections 68, 70 on the outer periphery side has a radial groove 74, 76, of which the radial groove 74 on the left in FIG. 1 serves to hold a primary sealing element 78 in the form of an elastomer grooved ring, while in the right-hand radial groove 76 in FIG. 1 is held a secondary sealing element 80, also in the form of an elastomer ring. FIG. 1 shows the sealing elements 78 and 80 in undistorted state to simplify the view. The primary sealing element 78 in the known manner delimits a pressure chamber 82 communicating with the pressure connection 24 in the cylinder housing 14 while an overrun chamber 84 provided between the outer periphery of the piston 12 and the wall of the blind bore 58 is delimited in the known manner by the primary sealing element 78 in FIG. 1 to the left and the secondary sealing element 80 in FIG. 1 to the right.

The connecting section 72 of the piston 12 is finally fitted with a transverse bore 86 adjacent to the cylindrical section 68, into which opens a longitudinal bore 88 extending through the cylindrical section 68. On the left-hand side in FIG. 1 of the longitudinal bore 88 is a central feed valve 90 known in itself, the elastomer valve body 92 of which is held axially mobile on piston 12 by means of a retaining cap 94 attached to the pressure chamber-side face of the piston 12 and also made of plastic. The retaining cap 94 also serves for play-free fixing of the ring magnet 18 to the piston 12 as described in detail in DE 202 08 568 U1 by the applicant, to which reference expressly is made here with regard to the design and function of the retaining cap 94 and that of the central feed valve 90.

In the filled state of the master cylinder 10 mounted in the hydraulic clutch control, the pressure chamber 82 in the base position of piston 12 shown in FIG. 1 communicates via the pressure compensation bore 82 and the overrun channel 30 with the overrun reservoir (not shown) and via the feed valve 90, longitudinal bore 88 and transverse bore 86 with the overrun chamber 84. The overrun chamber 84 is itself connected via the overrun bore 34 and overrun channel 30 with the overrun reservoir. If the piston 12 is now moved into the cylinder housing 14, i.e. to the left in FIG. 1, via the clutch pedal (not shown) attached to the stud head 52, the primary sealing element 78 passes over the pressure compensation bore 32 and thus interrupts the hydraulic connection between the pressure chamber 82 and the overrun reservoir. The pressure building up in the pressure chamber 82 pushes the valve body 92 of the feed valve 90 against the piston 12 and thus prevents the hydraulic fluid from flowing through the longitudinal bore 88 and transverse bore 86 into the overrun chamber 84, which is now however connected with the overrun reservoir via the overrun bore 34 and the pressure compensation bore 32. The pressure established in the pressure chamber 82 is transferred via the pressure connection 24 and the fluid column between the master cylinder 10 and the slave cylinder (not shown) connected to the pressure connection 24 in order to exert a release force on the dry friction clutch (not shown) actively connected with the slave cylinder. The axial movement of the piston 12 can here be detected by sensing the ring magnet 18 attached via the retaining cap 94 to the piston 12 by means of the sensor arrangement firmly connected to the cylinder housing 14 and comprising the Hall sensor 20 and the allocated flux guide element 22, through the wall of the cylinder housing 14 as will be described in more detail below.

When the clutch is released, the return force of the clutch presses the fluid column in the master cylinder 10 back. If the piston 12 of master cylinder 10, drawn via the stud 50, precedes this backflow movement—as can be caused for example by a return spring (not shown) on the clutch pedal—a negative pressure is created in the pressure chamber 82 of the master cylinder 10 and in the line system to the slave cylinder. Because of the pressure difference which then predominates between the two sides of the valve body 92 of the feed valve 90, the axially displaceable valve body 92 lifts away from the piston 12 and opens the longitudinal bore 88 in the piston 12. Hydraulic fluid then flows into the pressure chamber 82 from the overrun chamber 84 via the transverse bore 86 and the longitudinal bore 88 in the piston 12. As soon as the pressure difference between the two sides of the valve body 92 has equalized, the surplus quantity of the incoming hydraulic fluid flows back to the reservoir through the pressure compensation bore 32 which is now open again i.e. has been passed by the primary sealing element 78 in FIG. 1 to the right.

Further details of the sensor arrangement, comprising the Hall sensor 20 and the allocated flux guide element 22, of the sensor device 16 are given in particular in FIGS. 1 and 2.

Here the sensor housing 38 has an essentially L-shaped cross section with an essentially cuboid base section 96 and a connecting section 98 connected to the base section 96. The base section 96 of the sensor housing 38 lies flat on the support surface 38 of the cylinder housing 14 and holds protectively the Hall sensor 20 and allocated flux guide element 22. The connecting section 98 of the sensor housing 38, supported via the base section 96 by means of a rib 99, has a socket 100 known in itself in which can be attached a plug (not shown) by means of a snap connection in order to supply the sensor arrangement with current and receive sensor signals from the sensor arrangement.

As FIGS. 1 and 2 further show, in the embodiment shown the flux guide element 22 is a flat plate section, rectangular from a top view, made of a suitable magnetizable material such as ferromagnetic dynamo core sheet section. The flux guide element 22 lies with its lower longitudinal face 102 in FIGS. 1 and 2 flat on a base wall 104 of the base section 96 of the sensor housing 38 and is attached to this in a suitable manner—in the embodiment shown, by means of a glue connection (glue bead 106 in FIG. 2). The arrangement here is such that the flux guide element 22 extends essentially in the direction of the axial relative movement of the piston 12 in relation to the cylinder housing 14, or in other words lies essentially in the direction of the center axis of the blind bore 58 in the cylinder housing 14 and parallel to this.

The Hall sensor 20 lies on its allocated flux guide element 22. More precisely the Hall sensor 20 in the embodiment shown here lies at the longitudinal end of the flux guide element 22 on the right in FIG. 1, on the top longitudinal face 108 shown in FIGS. 1 and 2 of the flux guide element 22, slightly outside the area to be detected of axial relative positions of the ring magnet 18 to the Hall sensor 20. It should be recalled here that the piston 12 in the base position shown in FIG. 1 has already assumed its far right position in FIG. 1. Suitably the Hall sensor 20 is aligned in the direction of the flux guide element 22 or transverse to this. As the structure and function of Hall sensors are generally known and have already been described in the introductory portion of the description insofar as necessary for the understanding of the present invention, further explanations of this are not necessary at this point.

Shown diagrammatically in FIGS. 1 and 2, above the Hall sensor 20 is an analysis electronics unit 110 electrically connected therewith and also held in the sensor housing 38, which serves firstly to supply the Hall sensor 20 with current and secondly to process the signals emitted by the Hall sensor 20 and representative of the magnetic flux B in the flux guide element 22 and hence the axial position of the piston 12 in relation to the cylinder housing 14. Connected to the analysis electronics 110 are finally plug tabs 112 which extend into the socket 100 at the connecting section 98 of the sensor housing 38 in order to allow a current to be supplied from the outside and signals to be emitted to the outside.

Figure 4:
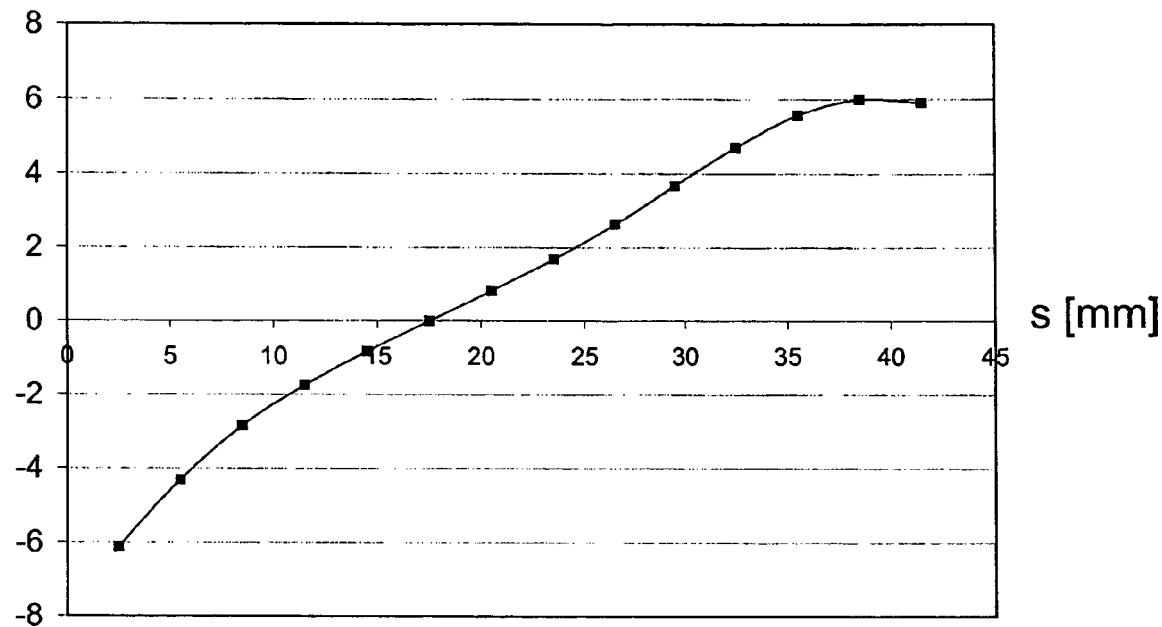
FIG. 4 is a diagram obtained in simulation for the sensor device according to FIGS. 1 to 3 in which the magnetic flux density B [mT] in the flux guide element is shown over the distance s [mm] of the magnetic signal element which this can cover relative to the magnetic-flux-sensitive sensor, wherein the magnetic-flux-sensitive sensor is arranged at measurement point 41.5 mm on the flux guide element in order to detect the magnetic flux therein created by the magnetic field of the magnetic signal element.
Figure 5:
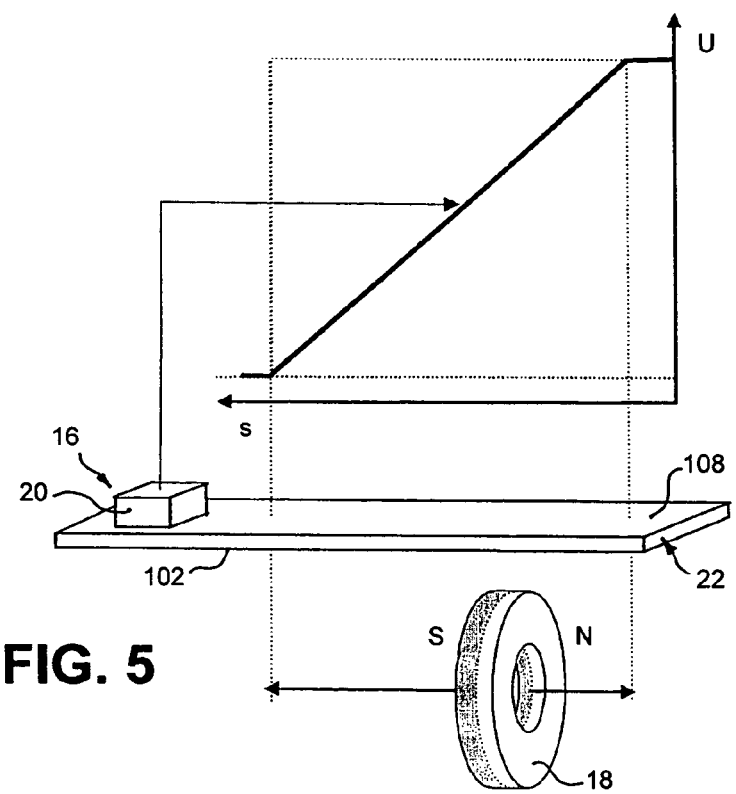
FIG. 5 is a principle view of the sensor device according to FIGS. 1 to 3 with a diagram showing, over the distance s covered by the magnetic signal element relative to the magnetic-flux-sensitive sensor, an output voltage U emitted by the magnetic-flux-sensitive sensor which the magnetic-flux-sensitive sensor can obtain from the graph of the magnetic flux density B according to FIG. 4.

FIG. 4, for the sensor device 16 described in FIGS. 1 to 3, shows the curve of the magnetic flux density B in the flux guide element 22 in mT (milli-Tesla) over the distance s of the piston 12 or the attached ring magnet 18 in mm, which can be detected by means of the Hall sensor 20 if this is arranged at a measurement point at 41.5 mm on the flux guide element 22. It is clear that the magnetic flux density B detected by means of the Hall sensor 20 increases steadily the closer the ring magnet 18 comes to the Hall sensor 20, and falls steadily the further the ring magnet 18 moves away from the Hall sensor 20. The curve of the magnetic flux density B over the travel s does not have a precisely linear development. The curve of the magnetic flux density B over the travel s can however easily be linearized by the analysis electronics 110 so that the sensor device 16 can emit a signal voltage U linearly dependent on the travel s of the piston 12 or attached ring magnet 18 as shown in FIG. 5. FIG. 5 also shows the magnetization direction of the ring magnet 18 with the south pole S on the one face and the north pole N on the other face of the ring magnet 18.

Figure 6:
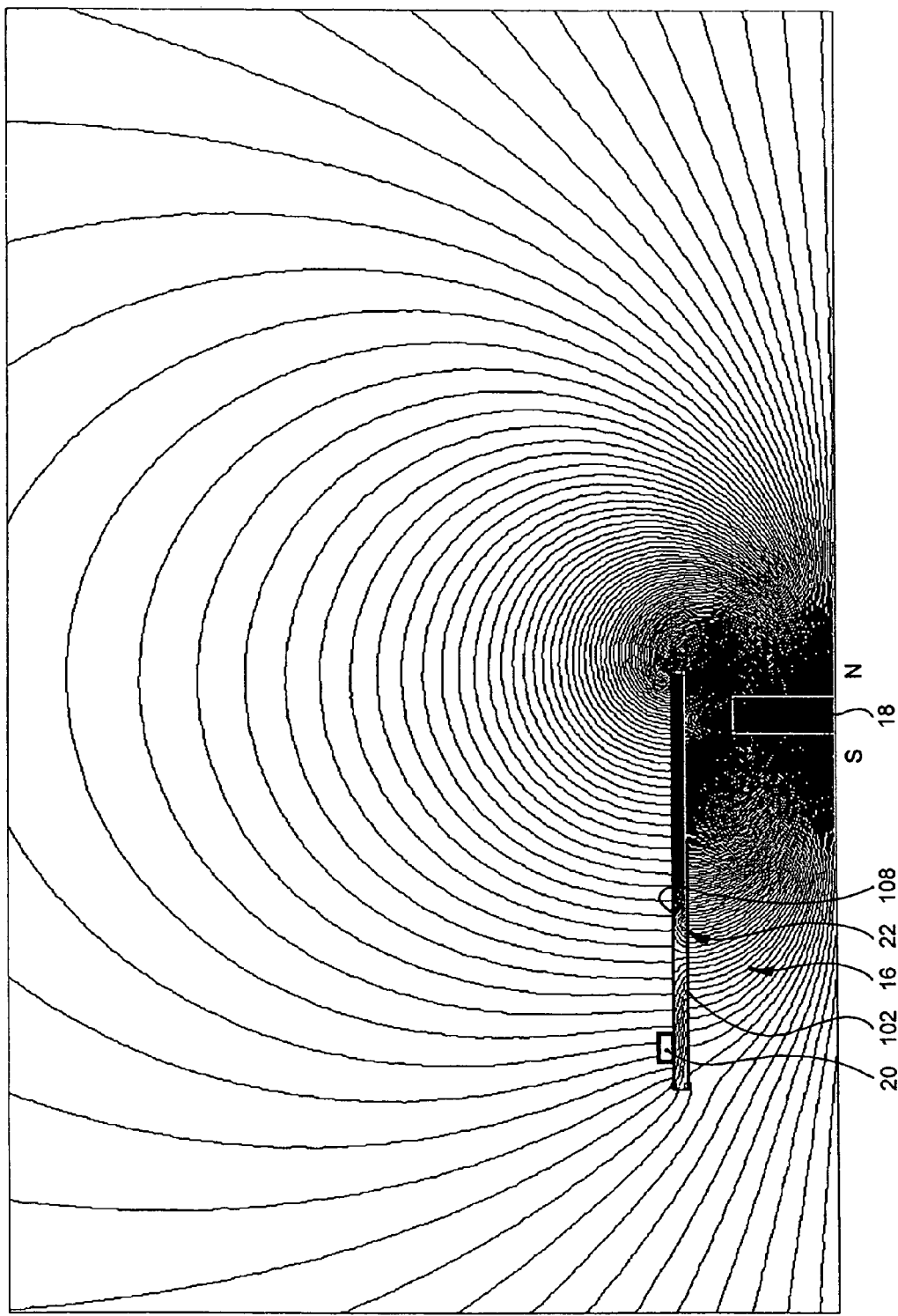
FIG. 6 is a broken-away view of the magnetic field of the magnetic signal element of the sensor device according to FIGS. 1 to 5 showing how the flux guide element allocated to the magnetic-flux-sensitive sensor bundles the field lines of the magnetic fields of the magnetic signal element.

FIG. 6 finally shows, for the sensor device 16 described with reference to FIGS. 1 to 5, the magnetic field of the ring magnet 18 for a particular relative position of the ring magnet 18 to the Hall sensor 20. It is clear that there is a virtual bundling of the field lines of the magnetic field of the ring magnet 18 occurring over the lower longitudinal face 102 and the upper longitudinal face 108 in the flux guide element 22, so that relatively high field strengths H arise in the flux guide element 22. The magnetic flux concentrated in the flux guide element 22 can consequently easily be detected by means of the Hall sensor 20 arranged on the flux guide element 22.

Although in the embodiment above the use of the sensor device 16 has been described as an example on a piston-cylinder arrangement with a "conventional" piston 12 which has two sealing elements 78, 80 co-operating with a housing-side run surface, it is evident to the person skilled in the art that the sensor device 16 can also be used on a "stem piston" in which a (secondary) sealing element, stationary in relation to the housing, co-operates with a run surface provided on the piston shaft while a (primary) sealing element attached to the piston head co-operates with a run surface on the housing side. Here the ring magnet 18 could also be attached to the piston head with a retaining cap.

Similarly the sensor device 16 could also be used with a "plunger piston" in which two or more sealing elements (not shown), stationary in relation to the housing, co-operate with a piston-side run surface (not shown) as described for example in DE 100 28 673 A1 by the applicant. Here on the cylinder housing according to DE 100 28 673 A1, a holder for the sensor housing 38 must also be provided, which e.g. can be formed as disclosed in DE 201 16 818 U1 by the applicant. In the "plunger piston" design, for the fixing of the ring magnet 18 to the piston, again as an example reference can be made to DE 202 08 568 U1 by the applicant (see there FIGS. 10 to 14), to which express reference is made here.

Although with the embodiment described in FIGS. 1 to 6 the analysis electronics 110 were described as a separate component from the Hall sensor 20, the analysis electronics—as already mentioned—can also be integrated in the Hall sensor. In this case only one plate is required to attach the Hall sensor, supply the current to and receive signals from the Hall sensor.

FIGS. 7 to 9 show further embodiments of the sensor device 16 which will be described below only insofar as they differ from the embodiment described with reference to FIGS. 1 to 6, where the same or corresponding parts have the same reference numerals. With regard to the function principle these embodiments do not differ from the embodiment in FIGS. 1 to 6.

According to FIG. 7 the flux guide element 22 in the longitudinal direction is divided into two sections 114, 116 between which is inserted the Hall sensor 20. As a result the Hall sensor 20 lies directly in the magnetic flux concentrated in the flux guide element 22, which increases the signal strength of the signal emitted by the Hall sensor 20 in relation to the embodiment in FIGS. 1 to 6. In a variant of this embodiment shown in FIG. 8, the sections 114, 116 of the flux guide element 22 taper towards the Hall sensor 20 and are angled towards the Hall sensor In the embodiment in FIG. 9, two flux guide elements 22, 22' are provided which run essentially parallel to each other and between which is inserted the Hall sensor. The signal detected with this sensor arrangement of Hall sensor 20, representative of the magnetic flux density B and hence the relative position of the ring magnet 18 to the Hall sensor 20, when applied over the distance s has a curve which is essentially more linear than that shown in FIG. 4 although in comparison with a sensor arrangement with just one flux guide element 22, the signal has a lower signal strength.

Shown in dotted lines in FIG. 9 is finally a variant of the sensor arrangement in which to obtain redundancy of the sensor signals, two Hall sensors 20, 20' are provided, of which the one Hall sensor 20 is arranged at one longitudinal end of the flux guide element 22 while the other Hall sensor 20'0 is arranged at the other longitudinal end of the flux guide element 22. This variant of the sensor arrangement can also be fitted with just one flux guide element 22.

Although in the embodiments described above the flux guide element 22 is made of one material or of one piece of one material, where applicable a laminate of different materials can be used as a flux guide element depending on the requirements.

A device is disclosed to sense the axial position, in relation to the other component, of one of two components moved relative to each other, in particular a piston in relation to a cylinder housing, which has a magnetic signal element arranged on one component and a magnetic-flux-sensitive sensor arranged on the other component, by means of which the axial relative position of the signal element to the sensor can be detected. According to the invention, allocated to the sensor is at least one flux guide element stationary in relation to the sensor, which extends on the other component at least over the area to be detected of axial relative positions of the signal element to the sensor and comprises a plate section of a magnetizable material, wherein the sensor is arranged at one longitudinal end of the flux guide element outside the area to be detected of axial relative positions. The result is a simple sensor device by means of which any axial relative positions between the components involved or their relative travel can be reliably detected with little installation space required.

Variations and modifications are possible without departing from the scope and spirit of the present invention as defined by the appended claims.

I claim:

1. A device for sensing the axial position, in relation to the other component, of one of two components mobile relative to each other, namely a piston in relation to a cylinder housing of a master or slave cylinder for a hydraulic clutch control for motor vehicles, with
- a magnetic signal element arranged on the one component, said magnetic signal element being a permanent ring magnet having a north pole facing the one component and a south pole facing away from the one component or vice versa, and
- at least one magnetic-flux-sensitive sensor arranged on the other component, by means of which the axial relative position of the signal element to the sensor can be detected, and
- only one flux guide element allocated to the sensor and stationary in relation thereto which on the other component extends on one side of the one component only at least over the area to be detected of axial relative positions of the signal element to the sensor and comprises a plate section of a suitable magnetizable material such as a dynamo core sheet section,
- wherein the sensor is arranged at one of the longitudinal ends of the flux guide element outside the area to be detected of axial relative positions of the signal element to the sensor,
- such that a magnetic flux density detected by means of the sensor increases steadily the further the signal element comes to the sensor, and falls steadily the further the signal element moves away from the sensor.

2. A device according to claim 1, wherein a section of the flux guide element tapers towards the magnetic-flux-sensitive sensor.

3. A device according to claim 1, wherein the magnetic-flux-sensitive sensor is a Hall sensor.

4. A device according to claim 1, wherein the flux guide element extends essentially in the direction of the axial relative movement of the one component in relation to the other component.

5. A device according to claim 1, in that wherein the magnetic-flux-sensitive sensor lies on the allocated flux guide element.

6. A device according to claim 5, wherein the magnetic-flux-sensitive sensor lies on one longitudinal face of the flux guide element.

7. A device according to claim 5, wherein the magnetic-flux-sensitive sensor lies at a face surface of the flux guide element.

8. A device according to claim 1, wherein the magnetic signal element is attached to a piston of a master or slave cylinder for a hydraulic clutch control for motor vehicles, while the magnetic-flux-sensitive sensor with the allocated flux guide element is attached to a cylinder housing of the master or slave cylinder.

9. A device according to claim 8, wherein the magnetic-flux-sensitive sensor and allocated flux guide element are accommodated in a sensor housing which is mounted at a predetermined point on the cylinder housing of the master or slave cylinder.

10. A device according to claim 1, wherein two magnetic-flux-sensitive sensors are provided.

11. A device according to claim 10, wherein the one magnetic-flux-sensitive sensor is arranged on one longitudinal end of the flux guide element while the other magnetic-flux-sensitive sensor is arranged on the other longitudinal end of the flux guide element.

* * * * *

UNITED STATES PATENT AND TRADEMARK OFFICE
CERTIFICATE OF CORRECTION

PATENT NO. : 7,170,278 B2  
APPLICATION NO. : 10/865375  
DATED : January 30, 2007  
INVENTOR(S) : Steffen Wohner Page 1 of 1

It is certified that error appears in the above-identified patent and that said Letters Patent is hereby corrected as shown below:

On the Title Page

Abstract item 57
Delete "∝" After "20" and insert --'--

In the Specification
Col. 12, Line 48 Delete "0" after "20"'

In the Claims
Col. 14, Line 10 Delete "in that" before "wherein"

Signed and Sealed this

Twenty-sixth Day of June, 2007

JON W. DUDAS  
*Director of the United States Patent and Trademark Office*